Oct. 14, 1941.  A. R. MOSLER, JR  2,258,659
METHOD AND DEVICE FOR COATING SHEET MATERIAL
Filed June 16, 1938
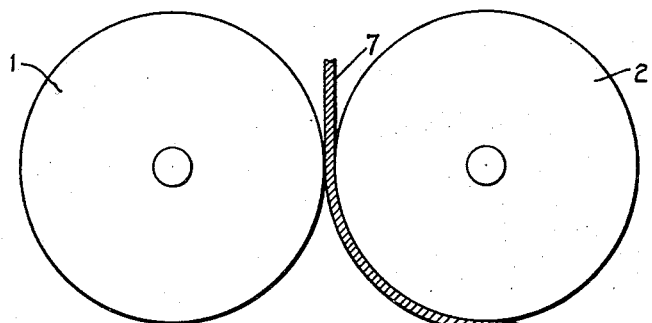
Fig. 1.
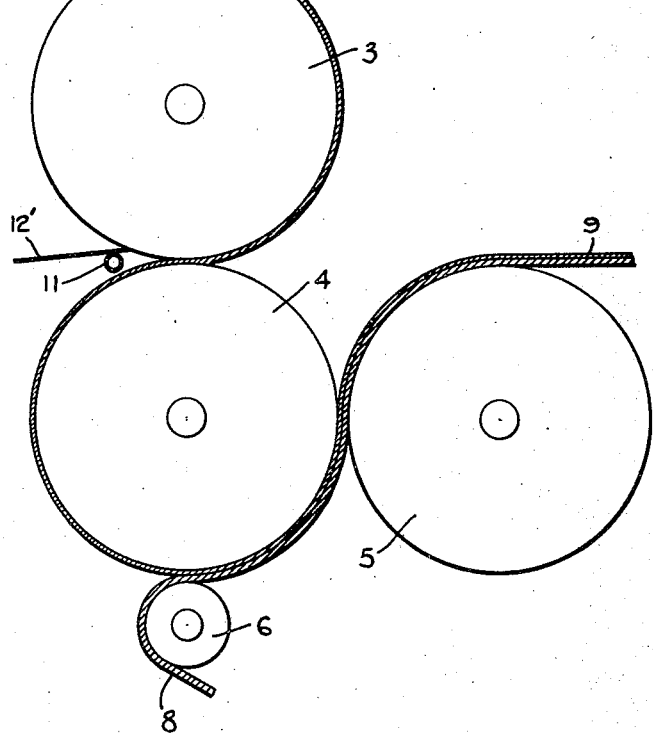
Fig. 2
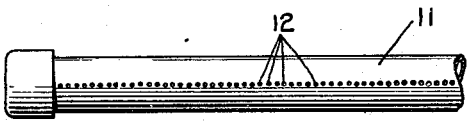
INVENTOR
ARTHUR R. MOSLER JR
BY
ATTORNEYS Patented Oct. 14, 1941

2,258,659

UNITED STATES PATENT OFFICE 2,258,659

METHOD AND DEVICE FOR COATING SHEET MATERIAL

Arthur R. Mosier, Jr., Cumberland, Md., assignor to Celanese Corporation of America, a corporation of Delaware Application June 16, 1938, Serial No. 214,017

11 Claims. (Cl. 154—2)

This invention relates to a method and device for coating sheet material such as fabrics, paper, wood, ply board, etc., with a thermoplastic derivative of cellulose or other thermoplastic composition.

An object of the invention is the production of a sheet material having thereon or therein a uniform thickness of a thermoplastic composition and preferably a thermoplastic composition containing an organic derivative of cellulose. Other objects of the invention will appear from the following detailed description and drawing.

In the drawing, wherein like reference numerals refer to the same or similar elements in the respective views:

Fig. 1 is an end view of a calender constructed in accordance with this invention, and Fig. 2 is a detailed view of the nozzle as applied to the calender.

Imitation leather and like materials have been made by flowing, spraying or brushing onto a suitable base material one coat or a plurality of coats of "dope" containing a nitrocellulose base dissolved in a suitable volatile solvent and then, if desired, embossing the coated surface. Recently it has been proposed to calender into a film a thermoplastic composition containing an organic derivative of cellulose and plasticizer in the absence of volatile solvents, effecting an adhesion of this film to a suitable base material and then, if desired, embossing the surface. The physical form of the thermoplastic composition that is to be calendered into the film may be of any suitable nature. For example, it may be in the form of a powder, crumbs, etc., or it may be a dough-like mass. The thermoplastic composition may have incorporated therein plasticizers, oils, pigments, dyes, fillers, etc.

Thermoplastic compositions, however, have the tendency to stick to the surface of heated calender rolls. This tendency may be diminished by controlling the heat applied to the rolls so that each successive roll is hotter than the one preceding. However, the gradation of heat from roll to roll is not always practical and proper adhesion of the ingredients of the thermoplastic composition is not always effected and therefore there results a sticking of the material to the calender rolls. Also, it is often necessary to have in the product certain materials which when mixed with the thermoplastic composition passing over the heated calender cause a sticking of the thermoplastic composition to the rolls.

To overcome the sticking or winding tendency of the thermoplastic material, by other than an accurate control of the heat supplied to the rolls or a restricted use of ingredients, doctor blades have been employed. Although these blades prevent the interruption of the process there is sometimes produced by their use an uneven application of the thermoplastic composition to the base material. This is due, among other things, to the fact that some of the thermoplastic material sticking to the blade and/or to the roll effect a creping action. Doctor blades effect a creping action by momentarily bunching up the film to produce a wave effect similar to that produced in crepe paper.

This invention eliminates the necessity of accurate and expensive heat control apparatus. It permits of the use of steam and other heating mediums which are not readily responsive to control where large volumes of metal are involved, as in heavy calender rolls. This invention also permits of the use of ingredients such as oils or a high percentage of filler, which ingredients have poor adhesion during the film formation even though in the finished article they produce no detrimental effects.

By employing this invention, a film of uniform thickness is produced as the film is smooth and free of waves and of crepe effect. A still further advantage of this invention is that it permits dirt or unconverted particles to pass through the calender unmolested. These particles when employing metallic doctor blades always left a streak when they lodged against the blade. These streaks are from 1–30 feet in length and vary in depth, depending upon the size of the particle, from a mere scratch to a complete severance of the film. By employing this invention these particles produce only a spot, usually so small as not to affect the commercial value of the product.

In accordance with my invention, I produce a film from a thermoplastic composition by calendering operations and overcome the tendency of the plastic material passing through the calender from splitting and/or clinging to the roll or doctor blades, or from wrapping itself around one of the rolls when the conditions are such as to cause such tendencies, by employing a blast of air or other gas at the point where two rolls diverge, which blast of air is adapted to remove the plastic material from one roll and flatten it against the other roll. If a blast of cold air is employed it also has a chilling action on one surface of the film being produced which aids in removing the film from one roll and laying it flat on the next roll. If desired, such a blast of air or other gas may also be employed at the place where the plastic material meets the base with which it is to be bonded. The blast of air is directed from a suitable nozzle or nozzles which are aided in controlling the direction of force of the blast by a baffle plate or plates. Higher air pressure is required when less plasticizer is present in the plastic material and with higher temperatures of the calender. Higher pressures are required the lower the viscosity of the thermoplastic material which will depend upon the temperature of the material, the amount of plasticizers and the viscosity of the ingredients of the thermoplastic material because low viscosity plastics tend to become more tacky and require more force to remove them from the roll.

Any suitable organic thermoplastic compound may be employed in this invention as the sheet forming and coating or impregnating substance. For instance, I may employ derivatives of cellulose, such as cellulose nitrate or organic derivatives of cellulose. The organic derivatives may be organic esters such as cellulose acetate, cellulose formate, cellulose propionate or cellulose butyrate, or cellulose ethers such as ethyl cellulose, methyl cellulose and benzyl cellulose. Thermoplastic compounds other than derivatives of cellulose, such as, for example, halogenated rubber, vinyl resins and the like may also be employed in this invention.

Any desired modifying agent for the thermoplastic compound may be incorporated therewith. By "modifying agent" I mean any substance which is adapted to impart any desired properties such as softness, elasticity, flexibility, hardness, gloss, color, stability, etc. to the finished product. Such modifying agents may be plasticizers, dyes, pigments, lakes, filling materials, fire retardants, resins, oils, etc.

The choice of plasticizer used will depend upon the properties of the thermoplastic compound employed. Examples of plasticizers are the aryl sulphonamides such as para ethyl toluol sulphonamide, the alkyl phthalates such as dimethyl phthalates, the dialkyl tartrates such as dibutyl tartrate, the alkoxy esters of polybasic organic acids such as diethyoxy ethyl phthalate, the polybasic organic acid esters of the mono-alkyl ethers of polyhydric alcohols such as diethylene glycol ethyl ether ester of phthalic acid, the alkyl esters of phosphoric acid such as triglycol derivatives of phosphoric acid, the aryl esters of phosphoric acid such as tricresyl phosphate, the mixed alkyl and aryl phosphates, and camphor. These plasticizers may be employed alone or in a combination of two or more and in any suitable quantity. Other suitable plasticizers may be employed alone or in admixture with any of the above, as is fully understood in the art.

The thermoplastic composition may be formed into a sheet in any suitable manner, then calendered and applied to the base material, or a molding powder may be directly calendered to a sheet-like web. Also a dough-like mass containing a very small amount of a volatile solvent may be calendered directly to a suitable film as well as heavy films that are calendered to thinner films. If desired, small amounts of volatile solvents may be present in the thermoplastic composition entering the calender, which volatile solvents are removed or substantially removed prior to the application of the thermoplastic material to the base material.

The base material employed may be any suitable backing for the thermoplastic composition and will depend to a great extent upon the use to which the finished product is intended. Thus for the production of imitation leathers for seat covers, bridge table tops, automobile upholstery and the like, the base material may be a woven fabric or felt. For this purpose it is usual to use unfinished cotton duck or cotton duck which is napped at one side, or a fabric which is woven to produce some sort of a pile. Where the finished product is to have some rigidity and is to be used as soda fountain and counter tops and the like, the base material may be ply wood, cardboard, laminated layers of fabric, heavy textile material such as burlap and the like. Where the material is to be employed as decorative effect often times requiring transmission of light therethrough, the base material may be fairly open mesh voile, ninon or net. Obviously any suitable backing which has some degree of porosity may be used as the base material.

In the drawing there is illustrated one form of my invention for the process of forming a plastic film and applying such film to a base of fabric. In Fig. 1 there is shown a calender composed of rolls 1, 2, 3, 4, 5 and 6. The calender rolls are located in suitable adjustable bearings so that the distance between rolls may be accurately adjusted to exert any desired pressure upon the web of plastic composition being formed. The calender rolls may be heated in any suitable manner as by steam, electrical resistance, open flames or other suitable means. Although six rolls are shown in the drawing there may be any desired number of calender rolls and the rolls may be arranged to form a horizontal or vertical type calender or a combination of a horizontal and vertical type. A suitable thermoplastic composition 7 is introduced into the calender between the rolls 1 and 2 which apply pressure on the material and raise its temperature so that it assumes a semi-plastic condition. This material 7 then passes between the roll 2 and 3 where it is further smoothed out and its thickness further reduced, and due to its contact with heated roll 3 becomes fairly plastic. The plastic material then passes through the nip between rolls 3 and 4 and is carried around the roll 4 until it contacts with a suitable base material 8. The base material may be warmed as it comes from any suitable source of supply. The base material may also be coated with a solvent or a plasticizer for the thermoplastic material prior to contact therewith to aid in forming a more uniform bonding action between the two. The base material is carried around the guide roller 6 and pressed against the plastic film. The film and base material are carried about a part of the roll 4 and between the nip formed by rolls 4 and 5 where a sufficient pressure is exerted thereon to at least anchor the plastic film onto the base material. By regulating the temperature and pressure, especially the pressure exerted between rolls 4 and 5, the plastic film may be caused to merely anchor to the base material or become embedded therein to such an extent that the other side of the base material appears to contain as much coating as the side to which the plastic material was applied. The composite article 9 may be drawn from the roll 5 and rolled into a package, or may be passed through a chilling device or an embossing machine, or both.

Between rolls 3 and 4 or between any of the other rolls, if desired, there is placed a pipe 11 which contains a horizontal line of holes 12 or a narrow horizontal slit of suitable length to produce a nozzle or series of nozzles. The nozzles are adapted to direct a blast of air against the roll 3 separating it from the plastic film and laying said plastic film on the roll 4. To aid in directing the blast of air to obtain the most efficiency therefrom there is placed over the pipe 11 a baffle 12', which baffle may be moved to or away from the roll 3 as desired. It is not always necessary to have the nozzles direct the blast of air directly into the nip of the rollers as the baffle plate 12' may be utilized to cause the force of the air, where the same is directed directly into the nip or above, to remove the plastic material from the upper roll and lay it flat on the lower roll. It will be noticed that although this device is employed for accomplishing the same objects as a metallic doctor blade no part of the device actually touches the plastic material, and, if desired, there may be sufficient clearance left between the baffle 12' and the roller to prevent any touching of the baffle with the roller which would tend to mar the surface of same.

Obviously the angle at which the blast of air is set may be suitably located depending upon the characteristics of the plastic material and diameters of the various rolls with which it is operating. The baffle 12' may also be moved to or from the roll to regulate the back pressure created thereby to enable the nozzles 12 to more accurately direct the force of the air blast. It is also desirable that the holes 12 or slots or other type of nozzle employed be such that the air blast is uniform from one side to the other side.

Any suitable gas may be employed as the blast and in certain cases even liquids may be employed. When working with plastic compositions containing cellulose acetate, air at room temperature is found very effective as this has a slight chilling action on the surface of the plastic material. However, if this chilling action is objectionable, air at elevated temperatures may be employed. For some purposes it is preferable to employ steam in place of air or steam containing solvent or precipitating vapors.

This invention may be modified to produce novel effects in the finished article if desired. For instance, pipe 11 may have the holes 12 spaced from each other while an exceptionally high air pressure is employed such that the force of the air leaves definite ridges in the plastic material for producing a fancy effect on the coated fabric. By reciprocating the pipe 11 back and forth these ridges may be made to have a definite wavy pattern. Also, as a modification of this invention, novel effects may be produced in the final product by intimately mixing particles of pigment or metallic powders or flakes with the air which will be blown onto the somewhat tacky material and embedded therein either uniformly over the entire width or, as stated immediately above, in parallel rows parallel to the length of the fabric or in wavy pattern.

It is to be understood that the foregoing detailed descripiton is merely given by way of illustration and that many variations may be made therein without departing from the spirit of my invention.

Having described my invention, what I desire to secure by Letters Patent is:

1. Method of forming composite materials, which comprises forming a plastic sheet by passing a thermoplastic material through the nip of a pair of rotating cylindrical surfaces and deflecting said sheet at the nip from one of the rotating surfaces to the other by the single step of causing a blast of fluid to impinge on the sheet as it emerges from said nip.

2. Method of forming composite materials, which comprises forming a plastic sheet by passing an organic derivative of cellulose material through the nip of a pair of rotating cylindrical surfaces and deflecting said sheet at the nip from one of the rotating surfaces to the other by the single step of causing a blast of fluid to impinge on the sheet as it emerges from said nip.

3. Method of forming composite materials, which comprises forming a plastic sheet by passing cellulose acetate material through the nip of a pair of rotating cylindrical surfaces and deflecting said sheet at the nip from one of the rotating surfaces to the other by the single step of causing a blast of fluid to impinge on the sheet as it emerges from said nip.

4. Method of forming composite materials, which comprises forming a plastic sheet by passing a thermoplastic material through the nip of a pair of rotating cylindrical surfaces, deflecting said sheet at the nip from one of the rotating surfaces to the other by the single step of causing a blast of fluid to impinge on the sheet as it emerges from said nip and applying the plastic sheet to a base material.

5. Method of forming composite materials, which comprises forming a plastic sheet by passing an organic derivative of cellulose material through the nip of a pair of rotating cylindrical surfaces, deflecting said sheet at the nip from one of the rotating surfaces to the other by the single step of causing a blast of fluid to impinge on the sheet as it emerges from said nip and applying the plastic sheet to a base material.

6. Method of forming composite materials, which comprises forming a plastic sheet by passing cellulose acetate material through the nip of a pair of rotating cylindrical surfaces, deflecting said sheet at the nip from one of the rotating surfaces to the other by the single step of causing a blast of fluid to impinge on the sheet as it emerges from said nip and applying the plastic sheet to a base material.

7. Method of forming composite materials, which comprises forming a plastic sheet by passing a thermoplastic material through the nip of a pair of rotating cylindrical surfaces and deflecting said sheet at the nip from one of the rotating surfaces to the other by the single step of causing a blast of fluid to impinge on the sheet as it emerges from said nip, said fluid being cooler than the plastic sheet to effect a slight chilling of one surface thereof and applying the plastic sheet to a base material.

8. Method of forming composite materials, which comprises forming a plastic sheet by passing a thermoplastic material through the nip of a pair of rotating cylindrical surfaces and deflecting said sheet at the nip from one of the rotating surfaces to the other by the single step of causing a blast of air to impinge on the sheet as it emerges from said nip, said air being cooler than the plastic sheet to effect a slight chilling of one surface thereof and applying the plastic sheet to a base material.

9. Method of forming composite materials, which comprises forming a plastic sheet by passing a thermoplastic material through the nip of a pair of rotating cylindrical surfaces and deflecting said sheet at the nip from one of the rotating surfaces to the other by the single step of causing a blast of steam to impinge on the sheet as it emerges from said nip, said steam being cooler than the plastic sheet to effect a slight chilling of one surface thereof and applying the plastic sheet to a base material.

10. A roll calender device for forming a plastic web, comprising a pair of heated rolls disposed to form a nip, a nozzle for supplying a fluid blast and a baffle adapted to direct the force of the blast against the web as it emerges from the nip of the rolls so that the blast removes the web from the one roll and lays it flat on the other roll, said nozzle and said baffle being spaced apart from the rolls and out of direct contact with the web.

11. A roll calender device for forming a plastic web, comprising a pair of heated rolls disposed to form a nip and means spaced from the nip and out of direct contact with the web adapted to remove the web from the one roll and lay it flat on the other of said rolls, said means comprising a baffle and device for directing a blast of air against the web, said baffle and said air supply device being spaced apart from the rolls and being so disposed in relation to the nip of the rolls as to form a substantially closed space in conjunction therewith.

ARTHUR R. MOSLER, Jr.